(12) United States Patent
Gryc et al.

(10) Patent No.: US 6,237,426 B1
(45) Date of Patent: May 29, 2001

(54) AIRFLOW SENSOR

(75) Inventors: Bogna Gryc; Alfred Theodor Dyck; Kenneth George Lenton, all of Winnipeg (CA)

(73) Assignee: E.H. Price Limited, Winnipeg (CA)

( * ) Notice: Subject to any disclaimer, the term of this patent is extended or adjusted under 35 U.S.C. 154(b) by 0 days.

(21) Appl. No.: 09/248,898

(22) Filed: Feb. 12, 1999

(51) Int. Cl.[7] .................................................. G01F 1/46
(52) U.S. Cl. ........................................................ 73/861.66
(58) Field of Search ........................... 73/861.66, 861.65, 73/861.42, 861

(56) References Cited

U.S. PATENT DOCUMENTS

| | | |
|---|---|---|
| D. 333,994 | 3/1993 | Mesnard . |
| 1,087,988 | 2/1914 | Sheldon . |
| 1,116,938 | 10/1914 | Sheldon . |
| 1,119,581 | 12/1914 | Dodge . |
| 1,145,222 | 7/1915 | Wilkinson . |
| 1,145,234 | 7/1915 | Dodge . |
| 1,192,761 | 7/1916 | Dodge . |
| 1,255,622 | 2/1918 | McFarland . |
| 1,508,017 | 9/1924 | Greve . |
| 3,831,448 | 8/1974 | Kors et al. . |
| 3,914,997 | * 10/1975 | Pinckney ............... 73/861.65 |
| 4,453,419 | 6/1984 | Engelke . |
| 4,546,655 | * 10/1985 | Victor ................... 73/861.66 |
| 4,717,159 | 1/1988 | Alston et al. . |
| 4,768,386 | * 9/1988 | Taddeo .................. 73/861.66 |
| 4,912,973 | * 4/1990 | Milewski et al. ........ 73/861.66 |
| 5,036,711 | * 8/1991 | Good .................... 73/861.66 |
| 5,099,686 | 3/1992 | Köhler . |
| 5,481,925 | 1/1996 | Woodbury . |
| 5,773,726 | 6/1998 | Mahoney et al. . |
| 6,044,716 | * 4/2000 | Yamamoto ............... 73/861.66 |

FOREIGN PATENT DOCUMENTS 1210610  2/1986  (CA) .

OTHER PUBLICATIONS

Nailor Industries Inc., "Diamond Flow Sensor", p. 7, Mar., 1997.
Titus, "Retrofit Terminals" and Fan Powered Terminals, 3 pages, 1996.
Enviro–tec, "Specifiers Guide", vol. 5, Winter 1997, 4 pages.

* cited by examiner

Primary Examiner—Harshad Patel
Assistant Examiner—Jagdish Patel
(74) Attorney, Agent, or Firm—Ridout & Maybee LLP

(57) ABSTRACT

An multi-point, center-averaging airflow sensor comprises a plurality of upstream airflow sensing tubes extending radially from a central hub having a total pressure averaging chamber and a static pressure averaging chamber. The airflow sensing tubes are each provided with at least one total pressure port located inwardly of the outer end of the tubes to minimize error caused by total pressure measurements taken near the inner walls of the conduit in which the sensor is installed. The sensor has static pressure ports located in the side surface of the hub which are shielded from upstream air flow by the tubes and which are preferably at least partially shielded from damper back pressure by notched reinforcing blades provided along the length of the airflow sensing tubes.

13 Claims, 8 Drawing Sheets

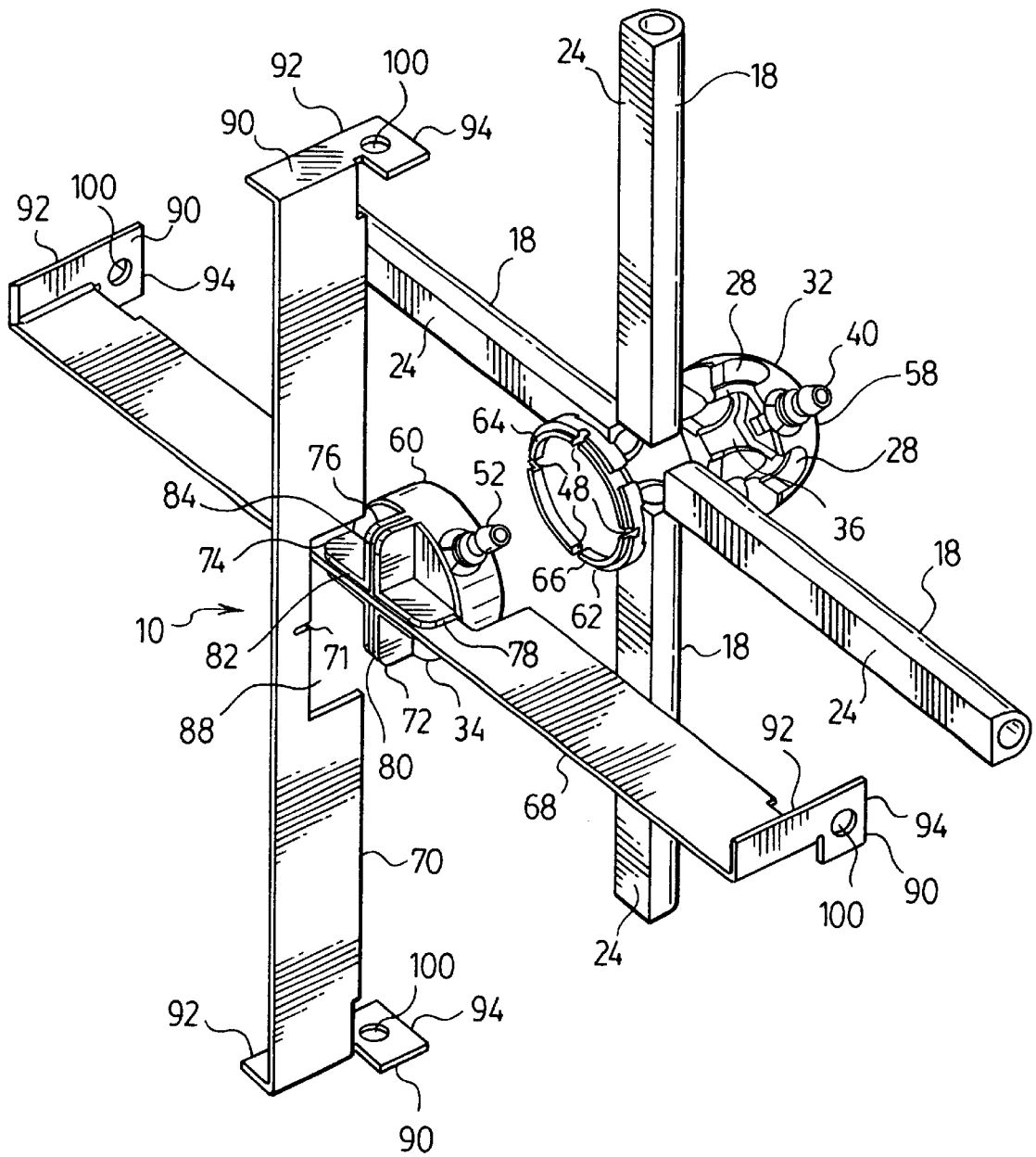

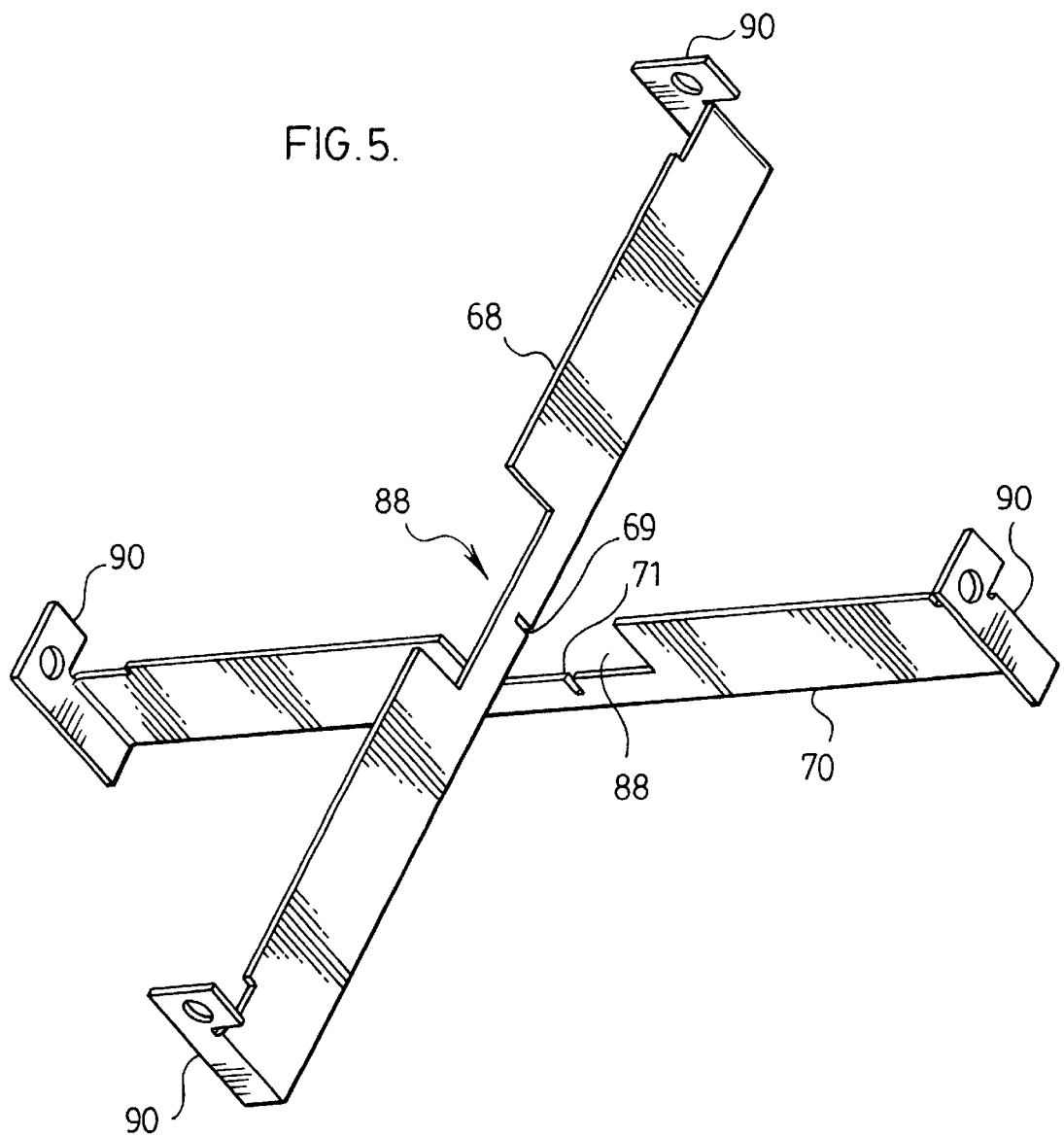

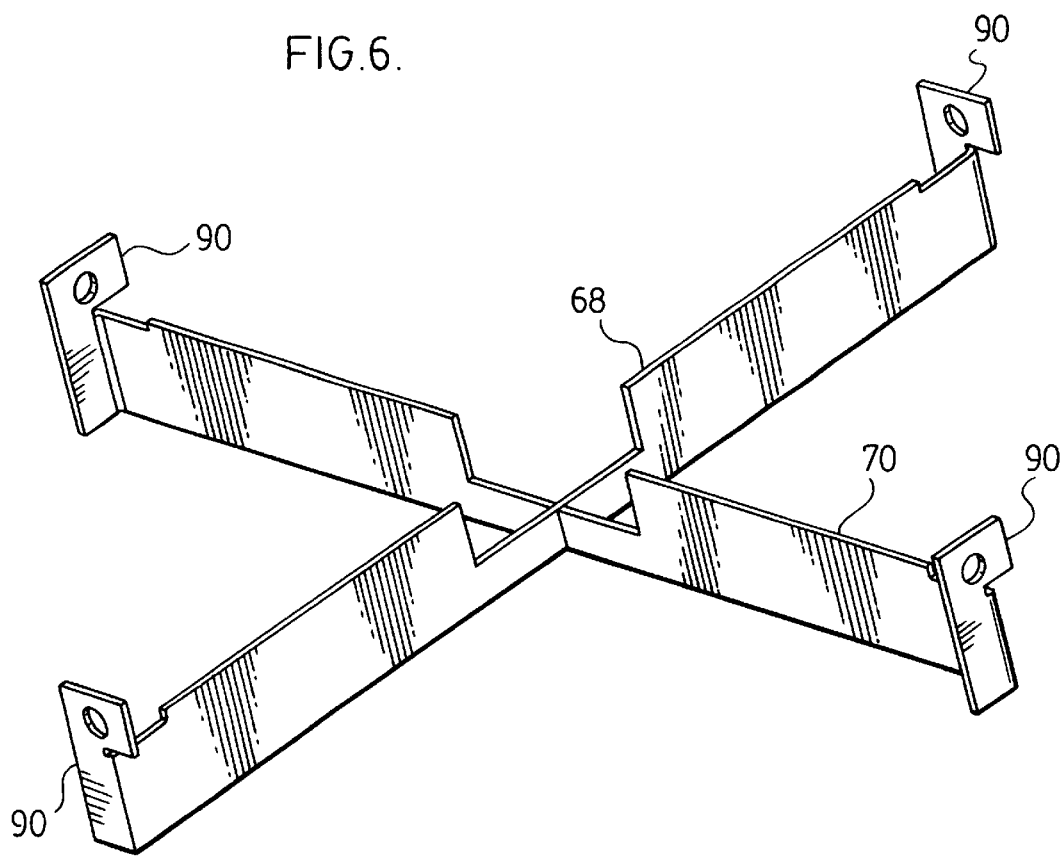

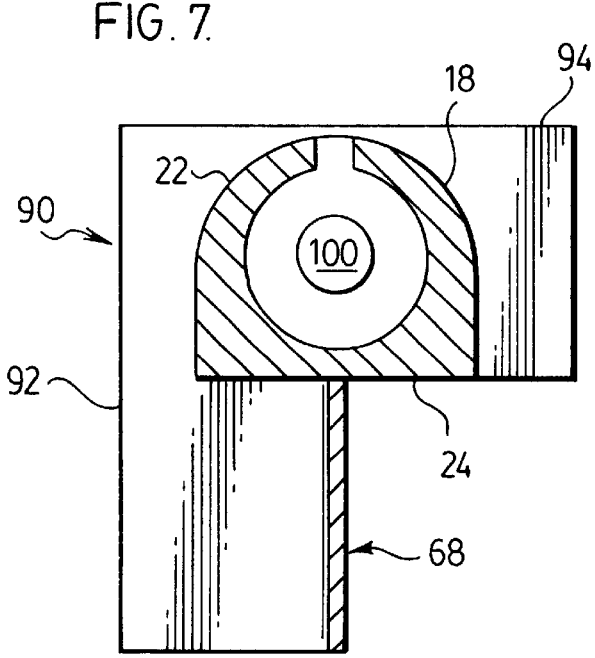
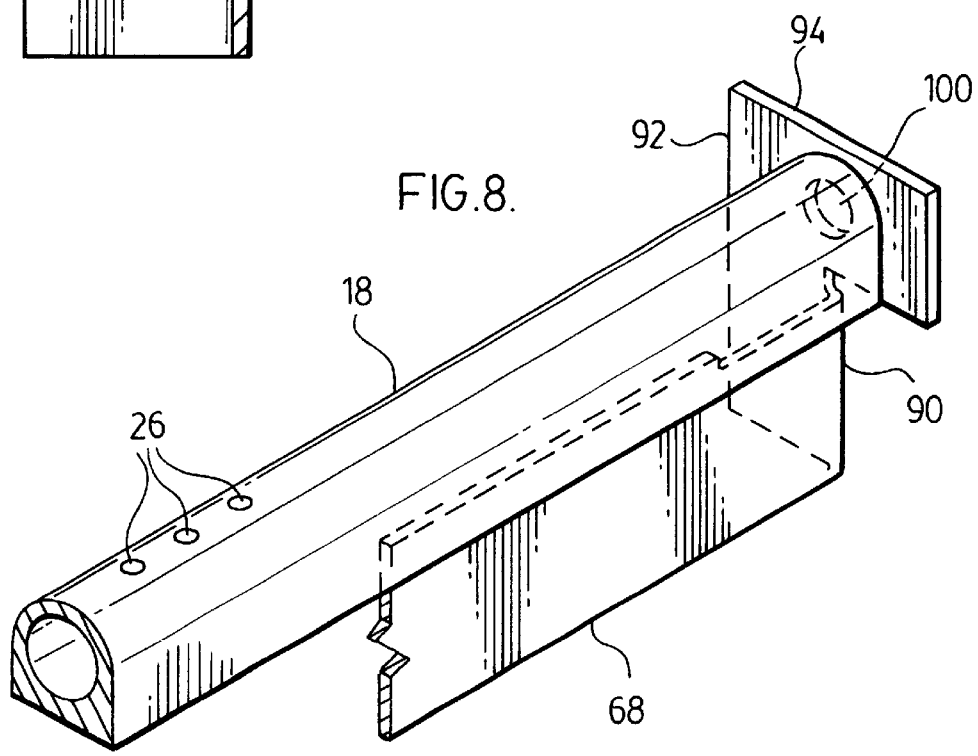

AIRFLOW SENSOR

FIELD OF THE INVENTION

The invention relates to sensors for sensing the volumetric flow rate of a fluid in a conduit, and more particularly to multi-point, center-averaging airflow sensors used to measure the total pressure and static pressure of an air stream.

BACKGROUND OF THE INVENTION

In variable air volume (VAV) heating, ventilation and air conditioning systems, the flow of air through a duct system is varied to provide thermal comfort and proper ventilation. Multi-point, center-averaging sensors are typically provided at the inlets of terminal boxes in VAV systems to measure the total pressure and static pressure produced by air flowing through the duct system. The difference between these two measurements, known as "differential pressure", is proportional to the flow of air through the duct system. The total and static pressure measurements, which are preferably averaged and amplified by the sensor, are transmitted to a controller which responds by increasing or decreasing the rate of air flow through the duct by opening or closing a damper located downstream from the sensor.

Typical examples of multi-point, center-averaging airflow sensors are disclosed in U.S. Pat. No. 4,453,419 (Engelke) and U.S. Pat. No. 5,481,925 (Woodbury). The sensor disclosed by Engelke comprises a number of pairs of tubes extending radially outwardly from a central hub. One tube of each pair has upstream facing holes and transmits a total pressure signal to a first chamber in the central hub, while the other tube of each pair has downstream facing holes and transmits a static pressure signal to a second chamber in the central hub. The total pressure signals and static pressure signals are averaged and amplified in the respective chambers of the hub and are then transmitted to the controller. The Woodbury sensor is similar to that of Engelke, however the total and static pressure sensing tubes are not paired and only a single static pressure port is provided at the radially outer end of the static pressure sensing tubes.

Most known airflow sensors operate on a principle similar to that of a standard Pitot tube, traversing the air stream and measuring the pressure at a number of locations in the duct. Such sensors are capable of generating reasonably accurate pressure measurements when the airflow pattern through the duct is substantially symmetrical, that is when the velocity of air flowing through the duct exhibits a parabolic distribution across the duct section, with the maximum velocity at the center of the duct and the minimum at the walls of the duct. While symmetrical airflow conditions may exist in relatively long, straight portions of the duct system, the presence of obstructions such as elbows, transitions, flexible ducts and dampers in the duct system cause turbulence which disrupt the symmetrical airflow pattern, and have a negative impact on the accuracy of the pressure measurements generated by the duct. This problem has typically been dealt with in the past by spacing the airflow sensor several duct diameters downstream from any elbows or the like, and several duct diameters upstream from dampers. The inventors have tested a number of known sensors and have found no sensor design which is immune to measurement errors resulting from asymmetric airflow.

Another problem associated with known airflow sensors is that the sensor itself is responsible for a certain amount of turbulence in the duct system. Sensor-generated turbulence causes a drop in pressure across the sensor as well as noise in the duct system. This problem has been dealt with in the prior art, for example in the Woodbury patent, by streamlining and minimizing the surface area of the sensor in order to reduce both turbulence and noise. More recently, this problem has also been addressed by eliminating the static pressure sensing tubes altogether and providing the sensor with only one static pressure port located on the rear surface of the hub. However, the inventors have discovered that back pressure in the duct system caused by a damper located downstream from the sensor causes inaccuracies in the static pressure signal generated by such a sensor.

Airflow sensors are typically supplied by manufacturers as assemblies comprising a sensor installed in either a short sheet metal sleeve or a terminal box to be incorporated into the duct system. When such assemblies are manually moved from place to place on a job site, it is not uncommon for the assembly to be lifted and carried by grasping one of the arms of the sensor. Due to the fact that the sensor tubes are typically of small diameter to reduce sensor surface area, they are easily damaged by such handling, the result being that the measurements generated by the sensor may be inaccurate. This problem has persisted despite warning labels affixed to sensor/duct assemblies by manufacturers.

SUMMARY OF THE INVENTION

The above discussed and other disadvantages of known airflow sensors have been overcome by the present invention, which provides an airflow sensor capable of generating accurate pressure measurements under symmetrical and asymmetrical airflow conditions, and which has minimal surface area and strength sufficient to withstand rough handling prior to installation.

The inventors have discovered through extensive experimentation that, under asymmetric air flow conditions, total and static pressure measurements made close to the walls of the duct are poor indicators of the actual air flow within the duct, and are responsible for a substantial amount of sensor inaccuracy. To overcome this problem, the airflow sensor of the present invention has static and total pressure ports which are located a sufficient distance from the walls of the duct so as to generate pressure measurements of acceptable accuracy even under asymmetric flow conditions.

In order to minimize face area of the sensor, the inventors have eliminated downstream airflow sensing tubes which are used in the Engelke and Woodbury sensors to measure static pressure. The static pressure ports in the sensor of the present invention are instead located directly on the hub of the sensor. The sensor of the present invention also avoids the problem of static pressure measurements being affected by damper back pressure by providing the static pressure ports on a side surface of the sensor.

Furthermore, the sensor of the present invention amplifies the pressure signal without increasing the face area, unlike Engelke and Woodbury. Signal amplification is achieved by experimentally determined optimum location of total pressure ports. Consequently, the sensor itself creates a minimal pressure drop and does not affect the sound level in the inlet duct.

In order to increase strength, the sensor of the present invention utilizes reinforcing blades which extend along the upstream airflow sensing tubes and which have a thickness which is less than the width of the tubes so as not to increase the face area of the sensor. The blades provide the sensing tubes with additional rigidity such that lifting of a duct section by grasping one of the sensor tubes will not result in damage to the sensor. The blades preferably also serve to shield the static pressure ports from damper back pressure and have mounting flanges at their radially outer ends by which the sensor is attached to the walls of the duct.

Accordingly, in one aspect, the present invention provides an airflow sensor adapted to be mounted within a flow conduit, comprising: a central hub comprising an exterior having an upstream surface and a downstream surface connected by a side surface, and an interior comprising two hollow chambers, a first of said chambers communicating with the exterior of the hub through at least one static pressure port located on the side surface of the hub, a plurality of upstream airflow sensing tubes extending radially outwardly from said central hub and communicating with a second of said chambers, each of said tubes having a hollow interior communicating with the exterior of the tube through at least one total pressure port, each total pressure port comprising a hole formed through an upstream facing surface of said tube; and attachment means for attaching said airflow sensor to an inner wall of the flow conduit.

BRIEF DESCRIPTION OF THE DRAWINGS

The invention will now be more fully described, by way of example only, with reference to the accompanying drawings, in which:

FIG. 4 is an exploded view of the airflow sensor shown in FIG. 1;

FIG. 5 is an isolated view of the reinforcing blades of the airflow sensor of FIG. 1 in a disassembled state;

FIG. 6 is an isolated view of the reinforcing blades of the airflow sensor of FIG. 1 in an assembled state;

FIG. 7 is a cross-sectional view along line 7–7' in FIG. 1;

FIG. 8 is a perspective view, partly in cross-section, showing one of the arms of the sensor of FIG. 1 and its associated reinforcing blade.

DETAILED DESCRIPTION OF PREFERRED EMBODIMENTS

Figure 1:
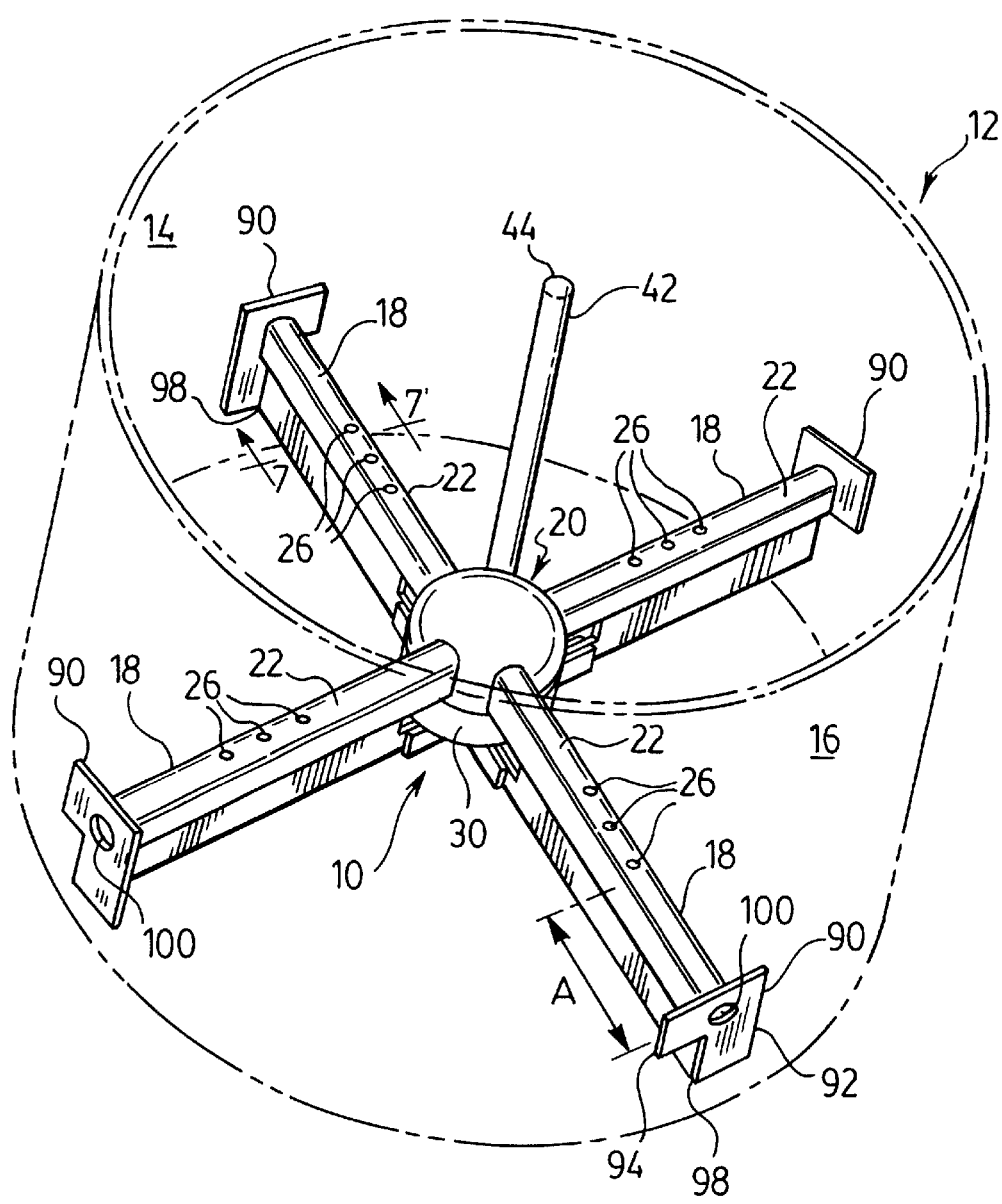
FIG. 1 is a top perspective view of a preferred multi-point, center-averaging airflow sensor according to the present invention installed in a section of duct.

FIG. 1 illustrates a preferred multi-point center-averaging airflow sensor 10 according to the present invention mounted in a section of air duct 12 having a circular cross-section with an inner surface 14 and an outer surface 16. The sensor 10 is preferably installed in a duct system upstream of a damper (not shown) which is pivotable within the duct to reduce or increase flow of air through the duct system. The operation of the damper is controlled in a known manner by a suitable controller mechanism which receives pressure signals from the airflow sensor 10 indicative of the volumetric rate of air flow through the duct system. Examples of suitable dampers and controllers are discussed and shown in the above-mentioned Engelke and Woodbury patents, which are incorporated herein by reference.

Airflow sensor 10 has an array of upstream airflow sensing tubes 18 extending radially outwardly from a central hub 20. Tubes 18 have a length sufficient to extend substantially from the hub 20 to the inner surface 14 of the duct 12 and are angularly spaced about the hub 20. The sensor 10 preferably has at least two angularly spaced sensing tubes 18, and in the preferred embodiment shown in the drawings includes four identical tubes 18 angularly spaced 90° from one another. The number of tubes 18 is at least partially dependent on the size of the duct in which the airflow sensor 10 is installed, and may preferably be increased for large ducts.

Each tube 18 has an exterior comprising an upstream-facing surface 22 and a downstream-facing surface 24. The term "upstream" is used throughout this application to indicate the direction opposite the direction of airflow in the duct 12 and "downstream" is used to indicate the direction parallel to the direction of airflow in the duct 12. The terms "longitudinal" and "transverse" are also used in this application, and respectively indicate directions parallel and perpendicular to the direction of air flow past the sensor 10. In order to reduce turbulence in the airflow due to the sensor 10, the upstream surface 22 is streamlined, preferably being rounded. In the preferred sensor 10 shown in the drawings, the exterior surface of each tube 18 has a constant D-shaped cross-section throughout its length, with the upstream surface 22 being substantially semi-circular and the downstream surface 24 being flat.

In a typical sensor 10 according to the preferred embodiment of the present invention, each tube 18 has a width of about 0.375 inches measured across its flat downstream surface 24 in the transverse direction and a thickness of about 0.33 inches measured in the longitudinal direction. As shown in FIG. 4, the interior cross-section of each tube 18 is preferably circular, with a preferred diameter of about 0.25 inches, the minimum thickness of the walls of the tubes 18 preferably being about 0.04 inches. The length of the tubes 18 is dependent on the size of the duct in which the sensor 10 is installed. For example, round ducts used in heating and air conditioning systems typically have a nominal diameter of from about size 6 to about size 16. In ducts of this size, the preferred length of tubes 18 varies from about 2.5 inches to about 7.5 inches. The tubes may preferably be made of plastic or a metal such as aluminum or steel, and are more preferably made from rigid polyvinyl chloride.

Each tube 18 is provided with at least one total pressure port 26 comprising a hole formed in its upstream surface 22. In a typical sensor 10 according to the preferred embodiment of the invention, three total pressure ports are provided angularly aligned along the center of the upstream surface 22 of the tube 18, the diameter of the total pressure ports 26 being about 0.063 inches.

The total pressure ports 26 admit high pressure components of the air stream into the upstream airflow sensing tubes 18, and are preferably arranged on each tube 18 in an evenly spaced arrangement. The spacing between adjacent ports 26 is dependent at least partially on the length of the tubes 18, preferably increasing with increasing tube length, and being about 10% of the tube length. It is to be appreciated that even spacing between the total pressure ports is not necessary, however it is preferred since it simplifies manufacturing.

As discussed above, the inventors have determined through extensive experimentation that pressure measurements made proximate the inner surface of the duct wall may not accurately indicate the flow rate of air moving through the duct. Therefore, in the preferred sensor 10 according to the present invention, the total pressure ports 26 are spaced radially inwardly from the outer ends of the tubes 18 by a sufficient distance to avoid generating inaccurate pressure measurements. The radial distance between the radially outermost total pressure port 26 and the inner surface 14 of the duct 12 (shown as distance "A" in the drawings) is at least partially dependent on the length of the tubes 18 and preferably varies from less than about 1 inch to about 2.5 inches. Expressed in relative terms, distance A is at least about 20% of the radius of the flow conduit, preferably from about 20 to about 50% of the radius of the flow conduit, more preferably from about 25% to about 45% of the length of each tube 18, and even more preferably from about 30% to about 35% of the length of tube 18.

The inner ends of the upstream airflow sensing tubes 18 are received in a friction fit by holes 28 formed through a side surface 30 of hub 20. The holes 28 are preferably D-shaped so that the tubes can only be inserted into holes 28 with the total pressure ports 26 facing upstream, thus preventing incorrect assembly of the sensor 10 and incorrect total pressure input. The side surface 30 is preferably generally parallel to the longitudinal direction and connects a streamlined upstream surface 32 and a generally flat downstream surface 34 of hub 20.

Figure 3:
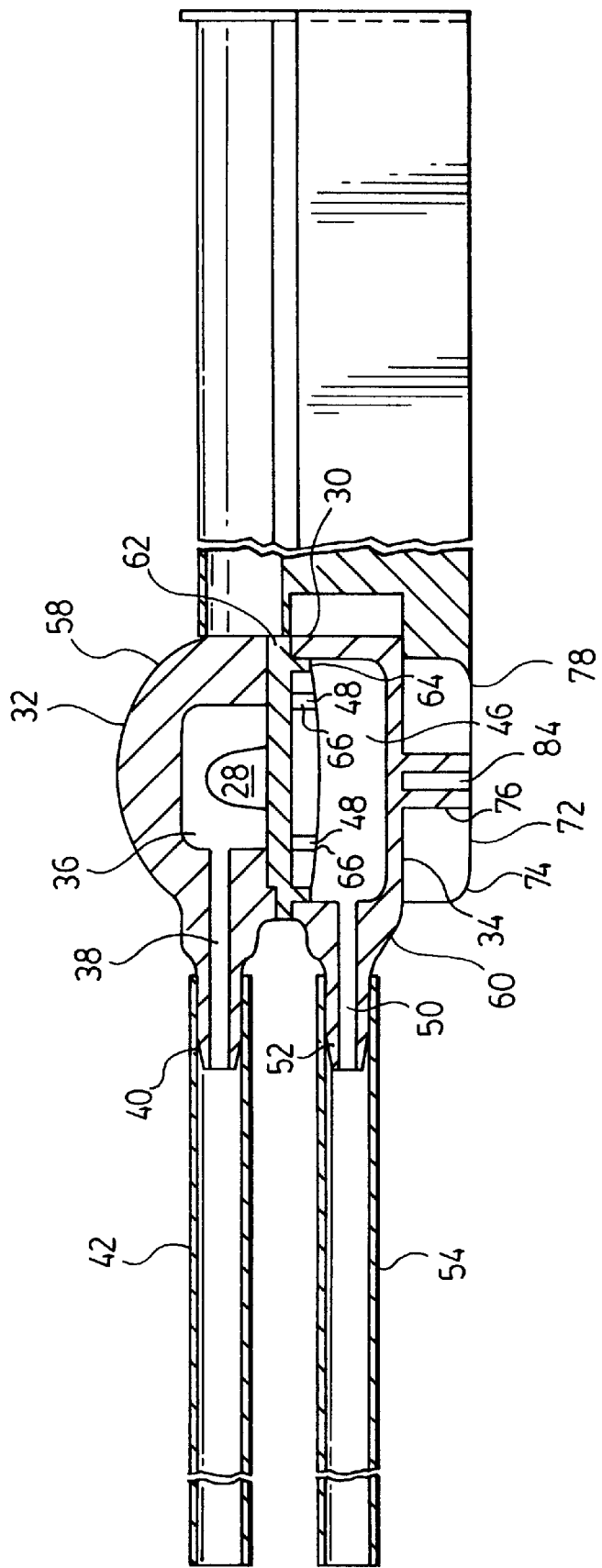
FIG. 3 is a cross-sectional side elevation view of the airflow sensor shown in FIG. 1.

The interiors of tubes 18 communicate with a total pressure averaging chamber 36 in hub 20 via holes 28, as shown in the cross-sectional view of FIG. 3. The air flowing into the total pressure ports 26 of the four tubes 18 of the sensor 10 creates high pressure signals which are approximately equal to the static pressure of the air plus the velocity pressure. The high pressure signals are transmitted through the tubes 18 to the total pressure averaging chamber 36 in hub 20. Since tubes 18 are spaced within the duct and the total pressure ports 26 are spaced along the tubes 18, the sensor 10 detects total pressure at various areas of the duct 12. These pressure signals created in each of the tubes 18 are resolved into an average high pressure signal in the total pressure averaging chamber 36 in hub 20.

The total pressure averaging chamber 36 is also provided with a radially extending passage 38 which leads from chamber 36 through an external barbed fitting 40 integrally molded with hub 20. A flexible tube 42 is connected at one end to fitting 40 and passes outwardly through a hole 44 in duct 12. The end of tube 42 extending to the outside of duct 12 is connected to the high pressure port of the controller (not shown). Thus, the upstream airflow sensing tubes 18 communicate with the controller via the total pressure averaging chamber 36 and flexible tube 42.

As shown in FIG. 3, hub 20 is also provided with a static pressure averaging chamber 46. Chambers 36 and 46 are separated by a central divider plate which, as shown in FIG. 3, forms one wall of each chamber 36 and 46. The side surface 30 of hub 20 is provided with at least one static pressure port 48 through which the interior of the static pressure averaging chamber 46 communicates with the exterior. In the preferred sensor 10 according to the invention, a total of four static pressure ports 48 are provided, angularly spaced from one another by about 90°, and preferably hidden downstream from each total pressure tube 18.

The inventors have discovered that locating the static pressure ports 48 on the side surface of the hub 20 provides advantages over prior art sensors. Firstly, the need for low pressure sensing tubes as in the Engelke and Woodbury sensors is eliminated, and secondly greater accuracy is obtained as compared to sensors having a single static pressure port on the downstream surface of the hub. In particular, the inventors have found that static pressure ports provided on the side surface of the hub are less subject to the effects of damper back pressure than ports located on the downstream surface of the hub, which would directly face the damper located downstream from the sensor. By thus providing static pressure ports 48 on the side surface 30 of hub 20, the sensor 10 achieves a reduction in sensor face area while enhancing accuracy of the static pressure measurements.

The static pressure ports 48 of preferred sensor 10 are preferably rectangular in cross section and have a size of about 0.080 by 0.040 inches. In order to accurately measure static pressure, the static pressure ports are preferably shielded from the air moving through the duct 12. In the preferred sensor 10, the static pressure ports 48 are located downstream relative to the airflow sensing tubes 18 and are angularly aligned with and shielded by tubes 18. Most preferably, the centre of each static pressure port 48 is located about 0.060 inches downstream from the flat downstream surface 24 of a tube 18. The static pressure signals from the four static pressure ports 48 are then averaged in the static pressure averaging chamber 46 and transmitted through radially extending passage 50, which is connected through barbed fitting 52 to a flexible line 54 extending through hole 56 in duct 12 to the low pressure port of the controller. Preferably, fittings 40 and 52 and flexible lines 42 and 54, respectively, are arranged to be angularly aligned with one another to further reduce turbulence caused by the sensor 10.

As most clearly shown in the exploded view of FIG. 4, the hub 20 is preferably of a three piece construction, comprising an upstream section 58 and a downstream section 60 connected to a dividing plate portion 62. The dome-shaped upstream section 58, which forms the total pressure averaging chamber and includes D-shaped holes 28 and fitting 40, is attached to one side of plate portion 62, while the dome-shaped downstream section 60, forming static pressure averaging chamber and including fitting 52, is attached to the opposite side of plate portion 62. As shown in FIG. 4, plate portion 62 is formed with a downwardly extending lip 64 which is positioned inwardly of the outer edge of plate portion 62, the lip 64 having notches 66 corresponding to the static pressure ports 48. The lip 64 of plate portion 62 is received in a close friction fit inside the upper rim of the downstream section 60 of hub 20, such that a portion of each notch 66 in lip 64 extends above the peripheral rim of downstream section 60 to form a static pressure port 48. Preferably, the three sections comprising hub 20 are formed from a metal such as aluminum or steel or a rigid plastic material such as rigid polyvinyl chloride. The hub 20 preferably has a diameter of about 1.125 inches. The inventors have found that hubs of substantially smaller diameters do not achieve proper averaging, whereas substantially larger diameter hubs cause undesired pressure drop over the sensor and increase noise levels.

The strength of sensor 10 is increased by the provision of sheet metal reinforcing blades 68 and 70 along the downstream surfaces 24 of the tubes 18 and the hub 20. Blades 68 and 70 preferably cross each other at about 90 degrees on the downstream surface 34 of hub 20, and both extend in a straight line from the outer end of one tube 18, across the downstream surface 34 of hub 20, to the outer end of an opposing tube 18. Blades 68 and 70 are respectively provided with narrow slits 69 and 71 located centrally between their ends which permit blades 68 and 70 to interlock in the manner shown in FIG. 5. A raised, cross-shaped support bracket 72 having four arms 74, 76, 78 and 80 is provided on the downstream surface 34 of hub 20, and is preferably integrally formed therewith. Bracket 72 has a first channel 82 extending through the length of opposed arms 74 and 78, and a second channel 84 extending through the length of opposed arms 76 and 80, these channels 82 and 84 being adapted to receive the central portions of interlocking blades 68 and 70 in a friction fit.

Blades 68 and 70 have a height, measured in the longitudinal direction, substantially equal to the longitudinal distance from the downstream surfaces 24 of tubes 18 to the downstream surface of bracket 72. The blades have a thickness, measured in the transverse direction, less than the width of the downstream surfaces 24 of tubes 18, and therefore do not increase the surface area of sensor 10. More preferably, the thickness of the blades 68 and 70 is about 0.04 inches. In fact, since the blades extend in the direction of the airflow, they enhance the air flow by acting as straightening vanes. This helps to further reduce air turbulence in the duct system.

As shown in FIGS. 5 and 6, the central portion 88 of each reinforcing blade 68 and 70 is notched, with the height of the notched portion being substantially equal to the height of the support bracket 72. The radial dimension of the notched portion of each blade 68 and 70 is preferably such that the notched portion extends radially outwardly from the side surface 30 of hub 20 by about 0.188 inches.

The inventors have found that the provision of blades 68 and 70 substantially increases the strength of sensor 10, making it highly resistant to rough handling on a job site. In particular, sensor 10 provided with blades 68 and 70 is sufficiently strong to permit a duct section containing sensor 10 to be transported by grasping one of the tubes of sensor 10 without damaging the sensor.

The blades 68 and 70 preferably extend radially along the center of each tube 18 and are therefore angularly aligned with the static pressure ports on the side surface 30 of hub 20. The inventors have found that the provision of notched blades 68 and 70 angularly aligned with the static pressure ports significantly improves the accuracy of static pressure measurements since the blades 68 and 70 partially shield the static pressure ports 48 from back pressure caused by the damper located downstream from sensor 10.

Figure 2:
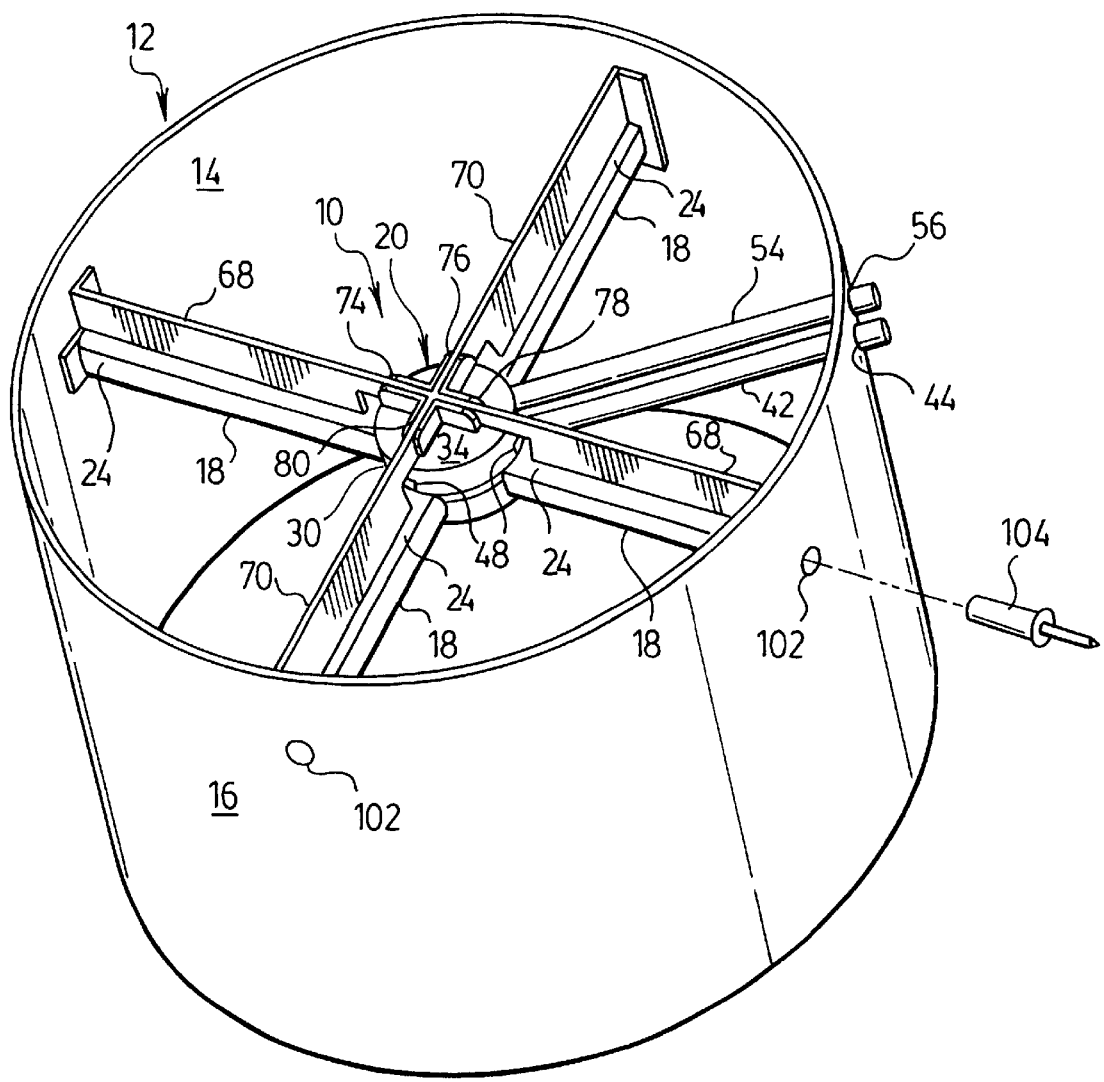
FIG. 2 is a bottom perspective view of the airflow sensor shown in FIG. 1.

FIG. 2 also shows that the blades 68 and 70 are provided at their radially outer ends with right angle flanges 90 which connect the sensor 10 to the inner wall 14 of duct 12. Each flange 90 is L-shaped and has a longer, longitudinally extending part 92 and a shorter, transversely extending part 94. Each flange 90 has a mounting opening 100 which is adapted to align with the open end of a tube 18.

Figure 9:
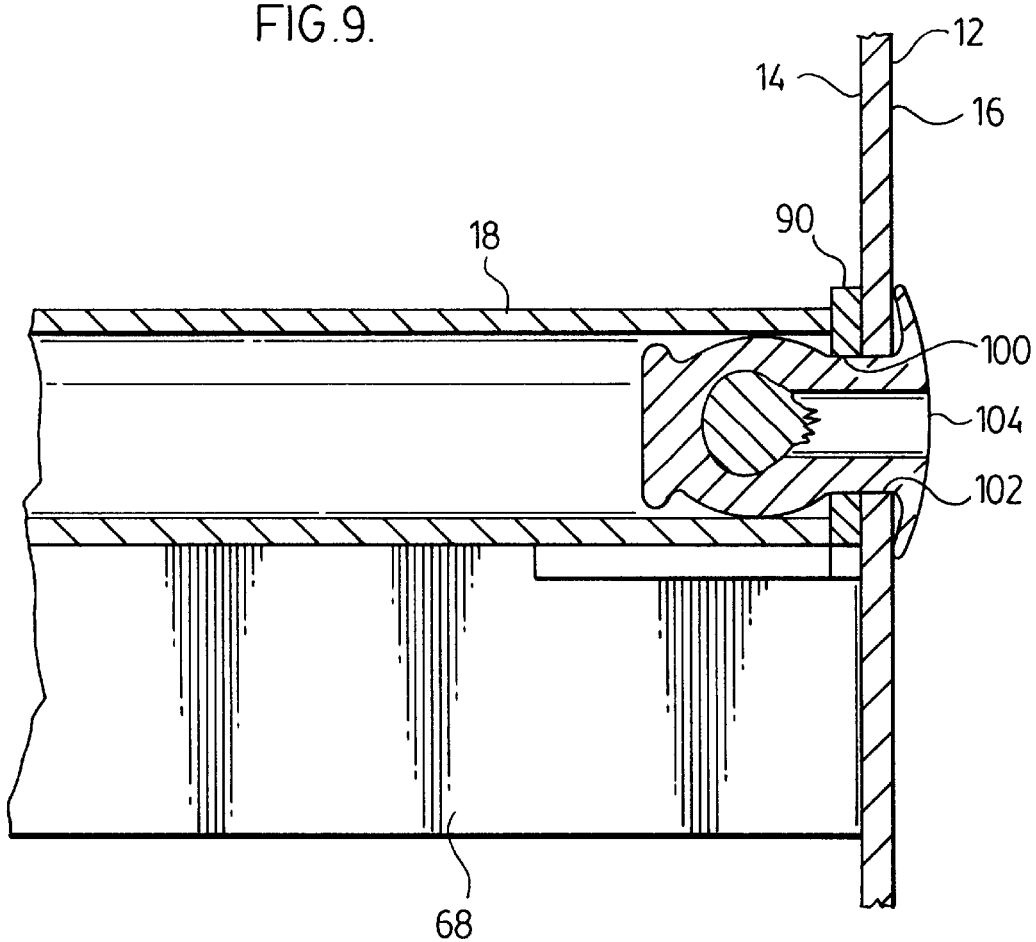
FIG. 9 is a cross-sectional view through the end of the tube of the sensor of FIG. 1 showing attachment of the sensor to the duct by a closed-end sealing "pop" rivet.

The sensor 10 is attached to duct 12 by threaded fasteners such as sheet metal screws or rivets which are driven inwardly through holes 102 in duct 12 which align with apertures 100 in the connecting flange 90. More preferably, sensor 10 is attached to duct 12 by closed-end sealing "pop" rivets 104. The use of closed end rivets is preferred since they simultaneously fasten the flange 90 to the duct wall inner surface 14 while fastening to and sealing the ends of tubes 18, thus preventing air from leaking from the ends of tubes 18. In the cross-sectional view of FIG. 9, closed end rivet 104 is shown after installation, extending through holes 100 and 102 and sealing the inside of tube 18. FIG. 2 shows rivet 104 prior to installation. Although the sensor 10 is shown in the drawings as being installed in a duct having a circular cross-section, it will be appreciated that the sensor 10 is adapted to be installed in ducts having a variety of cross-sections, for example rectangular ducts.

As discussed above, the length of tubes 18 and the spacing of the total pressure ports 26 from the ends of the tube 18 and from each other varies with tube length. In Table I set out below, the preferred tube lengths and pressure port spacings are shown in relation to the nominal diameters of circular ducts. For the duct sizes listed in Table I, the sensor according to the invention is preferably provided with four tubes, each having three total pressure ports, substantially as shown in the drawings.

TABLE I

| Duct Size | Tube Length (L)/in. | Distance from End of Tube to Outer Port (A)/in. ± 0.25 in. | Distance Between Total Pressure Ports (B)/in. | Ratio of A/L |
| --- | --- | --- | --- | --- |
| 16 | 7.500 | 2.500 | 0.750 ± 0.250 | 0.33 |
| 14 | 6.500 | 2.000 | 0.625 ± 0.250 | 0.32 |
| 12 | 5.500 | 2.000 | 0.625 ± 0.250 | 0.32 |
| 10 | 4.500 | 1.312 | 0.375 ± 0.125 | 0.29 |
| 9 | 4.000 | 1.312 | 0.375 ± 0.125 | 0.33 |
| 8 | 3.500 | 1.312 | 0.375 ± 0.125 | 0.37 |
| 7 | 3.000 | 0.750 | 0.312 ± 0.125 | 0.25 |
| 4, 5, 6 | 2.500 | 0.750 | 0.312 ± 0.125 | 0.30 |

As mentioned above, it is preferred that the sensor according to the invention transmits an amplified pressure signal to the controller. Some industry standard air flow controllers do not accurately control air flow where the pressure signal transmitted to the controller is less than 0.03 in water gauge (w.g.), which translates to an air velocity of at least 700 feet per minute (fpm) flowing past the sensor. Since VAV boxes must also operate at significantly lower flows, at least down to 400 fpm, it is preferred that air flow sensors amplify the pressure signal to between 0.03 and 1.0 in. w.g. for each duct size. The inventors have experimentally determined that the average velocity pressure must be amplified by about 1.7 to 2.5 times to generate a pressure signal within the above range. The spacing of the ports set out in Table I has been experimentally determined by the inventors both to minimize error caused by inlet obstructions and to amplify the pressure signal so as to be as close as possible to 1.0 in. w.g. at maximum flow. More specifically, the sensor according to the present invention amplifies the pressure signal by an average of 2.06 times, with the average maximum pressure signal being 0.87 in. w.g. and the average minimum pressure signal being 0.03 in. w.g.

Although the invention has been described in relation to certain preferred embodiments, it is to be understood that the invention is not restricted thereto. Rather, the invention includes all embodiments which may fall within the scope of the following claims.

What is claimed is:

1. An airflow sensor for mounting within a flow conduit having a radius, an inner wall and defining an upstream direction and a downstream direction, the airflow sensor comprising:

(a) a central hub comprising an exterior having an upstream surface and a downstream surface, a side surface connecting said upstream surface and said downstream surface, an interior comprising two hollow chambers, and at least one static pressure port located on the side surface of the hub, a first of said chambers communicating with the exterior of the hub through said at least one static pressure port;

(b) a plurality of upstream airflow sensing tubes extending radially outwardly from said central hub and communicating with a second of said chambers, each of said tubes having a hollow interior, an exterior, an upstream facing surface and a downstream facing surface on said exterior, an outermost end, and at least one total pressure port, the hollow interior communicating with the exterior of the tube through said at least one total pressure port, each said at least one total pressure port comprising a hole formed through said upstream facing surface of said tube; and (c) attachment means provided at the outermost end of each of said upstream airflow sensing tubes and attached to said inner wall of the flow conduit;

wherein said at least one static pressure port comprises a plurality of said static pressure ports, said plurality corresponding in number to said plurality of upstream airflow sensing tubes, said static pressure ports being located downstream relative to said upstream airflow sensing tubes, and wherein each of said static pressure ports is angularly aligned with one of said upstream airflow sensing tubes, and wherein the upstream facing surface of each said upstream airflow sensing tubes is streamlined and the downstream facing surface is flat.

2. The airflow sensor of claim 1, wherein said at least one total pressure port comprises a plurality of said total pressure ports, said total pressure ports being angularly aligned along said tube with an outermost one of said total pressure ports being spaced from the outermost end of said tube so that, when the upstream airflow sensing tubes are attached to the inner wall of the flow conduit, the outermost total pressure port is spaced from said inner wall of the conduit by a radial distance of at least 20% of the radius of the flow conduit.

3. The airflow sensor of claim 2, wherein said radial distance is from about 20 to about 50% of the radius of the flow conduit.

4. The airflow sensor of claim 3, wherein said radial distance is from about 25 to about 45% of the radius of the flow conduit.

5. The airflow sensor of claim 2, wherein said total pressure ports are evenly spaced along said tube.

6. The airflow sensor of claim 5, wherein said tubes have a length, and the spacing between adjacent total pressure ports is about 10 percent of the length.

7. The airflow sensor of claim 6, having three of said total pressure ports on each of said tubes.

8. The airflow sensor of claim 1, wherein an angular spacing between adjacent tubes of said plurality of tubes is constant.

9. The airflow sensor of claim 8, having four of said tubes angularly spaced from one another by 90 degrees.

10. The airflow sensor of claim 1, additionally comprising a plurality of reinforcing blades corresponding in number to said plurality of upstream airflow sensing tubes, each of said blades extending radially outwardly along and downstream from an associated one of said tubes, with each of said blades having a thickness which is less than a width of each of said tubes.

11. The airflow sensor of claim 10, wherein each of said reinforcing blades extends along a length of one of said tubes, with a central portion of each of said reinforcing blades being notched to provide a space between said blade and said side surface of said hub.

12. The airflow sensor of claim 11, wherein each of said reinforcing blades has an outermost end, and further comprises a flange located at the outermost end.

13. The airflow sensor of claim 1, wherein each of said upstream airflow sensing tubes has a D-shaped cross-section.

* * * * *